United States Patent [19]

Braun

[11] 4,267,570

[45] May 12, 1981

[54] CONTROL UNIT FOR MULTI-PHASE STATIC CONVERTER

[75] Inventor: Rüdiger Braun, Erlangen, Fed. Rep. of Germany

[73] Assignee: Siemens Aktiengesellschaft, Berlin & Munich, Fed. Rep. of Germany

[21] Appl. No.: 62,304

[22] Filed: Jul. 31, 1979

[30] Foreign Application Priority Data

Aug. 21, 1978 [DE] Fed. Rep. of Germany ....... 2836573

[51] Int. Cl.³ .......................................... H02M 7/515
[52] U.S. Cl. ..................................... 364/480; 363/138
[58] Field of Search ................. 363/138, 137, 136, 98, 363/96; 364/480

[56] References Cited

U.S. PATENT DOCUMENTS

| | | | |
|---|---|---|---|
| 3,458,795 | 7/1969 | Ainsworth | 363/96 X |
| 3,603,866 | 9/1971 | Opal | 363/136 X |
| 3,609,511 | 9/1971 | Risberg | 363/137 X |
| 3,697,843 | 10/1972 | Riess | 363/137 X |
| 4,050,006 | 9/1977 | Stich | 363/138 X |
| 4,087,851 | 5/1978 | Klautschek | 363/138 X |
| 4,173,722 | 11/1979 | Detering | 363/96 X |

*Primary Examiner*—Edward J. Wise
*Attorney, Agent, or Firm*—Kenyon & Kenyon

[57] ABSTRACT

A digital control unit has an oscillator driven, binary coded counter, the outputs of which are connected to the first addend inputs of a number of adders. The second addend inputs of the adders are connected to phase angle inputs. The summation outputs of the adders are connected to a logic circuit, which derives timing pulses from the signals at the summation outputs of the adders and interlinks them to form a three-phase system of firing pulses for the controlled valves of the converter. The control unit can be used for fast shutdown of the controlled converter by blocking the firing pulses for the controlled main valves and shifting the firing pulses for the quenching valves as a function of the instantaneous phase of the converter output voltage; also the operating frequency can be increased.

4 Claims, 8 Drawing Figures

CONTROL UNIT FOR MULTI-PHASE STATIC CONVERTER

BACKGROUND OF THE INVENTION

1. Field of the Invention

This invention relates to control units for static converters. More particularly, the invention relates to control units for generating control pulses for static converters from the outputs of pulse driven counters which are processed to form firing pulses for the converter.

2. Description of the Prior Art

In known control units for static converters, the necessary reference voltage generators and comparators utilize analog technology. In control units for multi-phase converters, an appropriate number of reference voltages, for instance sawtooth voltages, must be generated, shifted in time, and compared with a control signal. To avoid asymmetry, the reference voltages must be balanced against each other very accurately. To this end, it is necessary to adjust all components used and to compensate drift errors.

It is an object of the present invention to provide a simple control unit for a multi-phase static converter which can be produced without adjusting cost and can be expanded in a simple manner for additional operating requirements.

SUMMARY OF THE INVENTION

According to the invention, this problem is solved by providing an oscillator which drives a binary-coded counter, the outputs of which are connected to the first addend inputs of a number of adders. The second addend inputs of the adders are connected to phase angle inputs, and the summation output signals of the adders are connected to a logic circuit which derives timing pulses from them and interlinks them to form firing pulses for the controlled valves of the converter.

With the control of the present invention, uncontrolled operation of a multi-phase converter with a fixed pulse pattern can readily be obtained. The signals at the summation outputs of the adders form a pulse raster from which timing pulses can be derived and interlinked to form firing pulses. The timing pulses can be obtained by means of monostable multivibrators which are triggered by the edges (flanks) of the pulses at the summation outputs of the adders and which are set to the desired pulse times. However, it is also possible to use digital timing stages. Such a digital timing stage contains, for instance, an oscillator, oscillating at a constant frequency, which drives a counter, the content of which is monitored by an elevation circuit. The counter is released at the start of the desired timing pulse and counts the oscillator pulses up to a predetermined count; the evaluation circuit then resets the counter and terminates the timing pulse.

A particular advantage of the control unit of the invention is the simple way in which firing pulses for a multi-phase converter, especially a three-phase converter, can be formed. The multi-phase firing pulses are realized in a simple manner by digital phase angle inputs which can be either fixed or controlled by phase angle controllers.

The digital components used in a control unit according to the invention such as counters, adders and logic members do not have unit-to-unit differences in characteristics which affect for the operation. Therefore, no adjusting effort of any kind is required.

One embodiment of the control unit according to the invention makes possible fast shutdown of the converter upon a protection command, for instance, in case of a short circuit in a load. For a fast shutdown, the firing pulses for the main valves are blocked and the firing pulses for the quenching valves are shifted in a manner which depends on the instantaneous phase. In addition, the operating frequency can be increased, preferably to several times the normal operating frequency, which accelerates the shutdown operation. By shifting the firing pulses for the quenching valves, the main valves then carrying current are quenched in optimum time. Circuitwise, this can be realized by providing a multiplexer, of which the first group of inputs is connected directly to the outputs of the counter, of which the second group of inputs is connected to outputs of the counter, shifted by at least one digit, and of which the outputs are connected to the first addend inputs of the adders. The second addend inputs of the adders are connected, via intermediate memories, to the outputs of data memories, the address inputs of which are connected to the outputs of the counter and which are programmed for a firing pulse shift which is optimum for every counter reading, the multiplexer being switched, in the event of a fast shutdown, and the output signals of the data memory being transferred into the temporary storage devices.

DETAILED DESCRIPTION OF THE INVENTION

Figure 1:
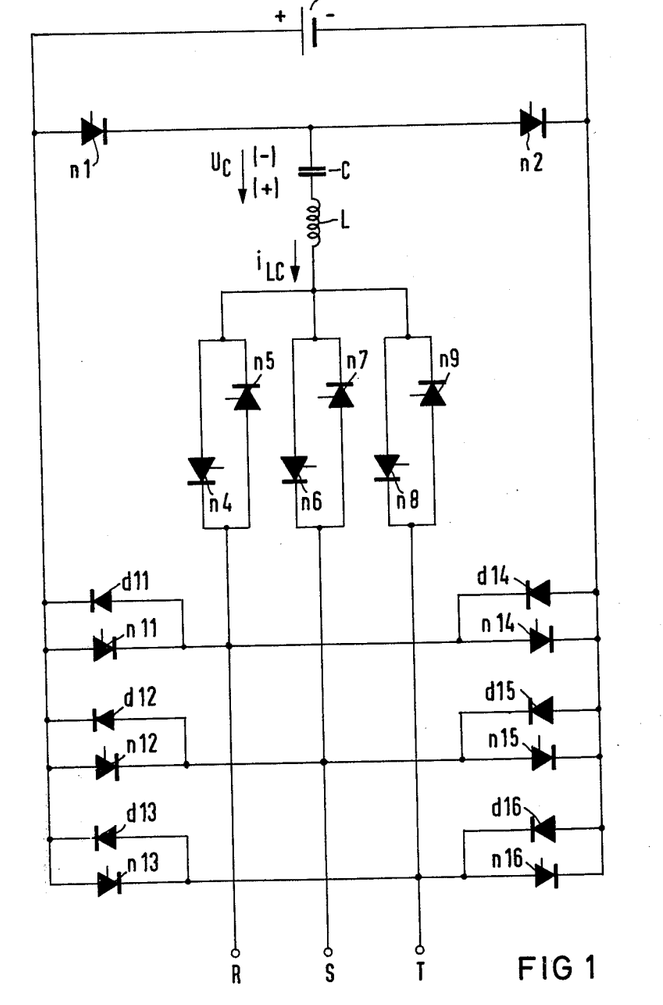
FIG. 1 is a schematic diagram of the circuit of a prior art static converter.

FIG. 1 shows the circuit design of a known, three-phase, six-pulse converter (Aircraft electrical power seminar, May 10-11, 1977, Technical Proceedings, p. 59 to 68, FIG. 14; New York ACS 11,406, revised 3/78). As controlled valves, the circuit can use, for example, thyristors and, as uncontrolled valves, for example, diodes. For the sake of greater clarity, the protective circuit elements of the valves are not shown. In the practical embodiment, all valves are shunted by R-C members, and magnetic components for limiting the voltage and current rate of rise are associated with them. Likewise, circuit measures for regulating the commutation processes are known (McMurray, loc. cit., FIG. 16, Auslegeschrift No. 23 23 905), which are not shown here.

The converter is designed as a three-phase bridge inverter and converts the input DC voltage from a voltage source B, such as, a battery or an intermediate DC circuit, into an AC voltage having phases RST, and forming a three-phase system. The bridge circuit for phase R contains the bridge arms having controlled main valves n11 and n14. The bridge circuit for phase S contains the bridge arms having controlled main valves n12 and n15. The bridge circuit for phase T contains the bridge arms having controlled main valves n13 and n16. The controlled main valves n11 and n16 are shunted by the respective antiparallel-connected recovery diodes d11 to d16.

A series resonant circuit comprising a commutating capacitor C and a commutating choke L are associated with controlled main valves n11 to n16. The capacitor voltage is designated $U_c$ and the current in the series resonant circuit is designated $i_{LC}$. The lower terminal of the LC series resonant circuit is connected to inverter phase R, via antiparallel-connected controlled auxiliary valves n4, n5, to inverter phase S, via a second circuit having antiparallel-connected controlled auxiliary valves n6, n7, and to inverter phase T, via a third antiparallel-connected circuit having controlled auxiliary valves n8, n9. The upper terminal of the series resonant circuit is connected to the positive potential via a controlled quenching valve n1 and to the negative potential of the DC voltage source B via a controlled quenching valve n2.

Figure 6:
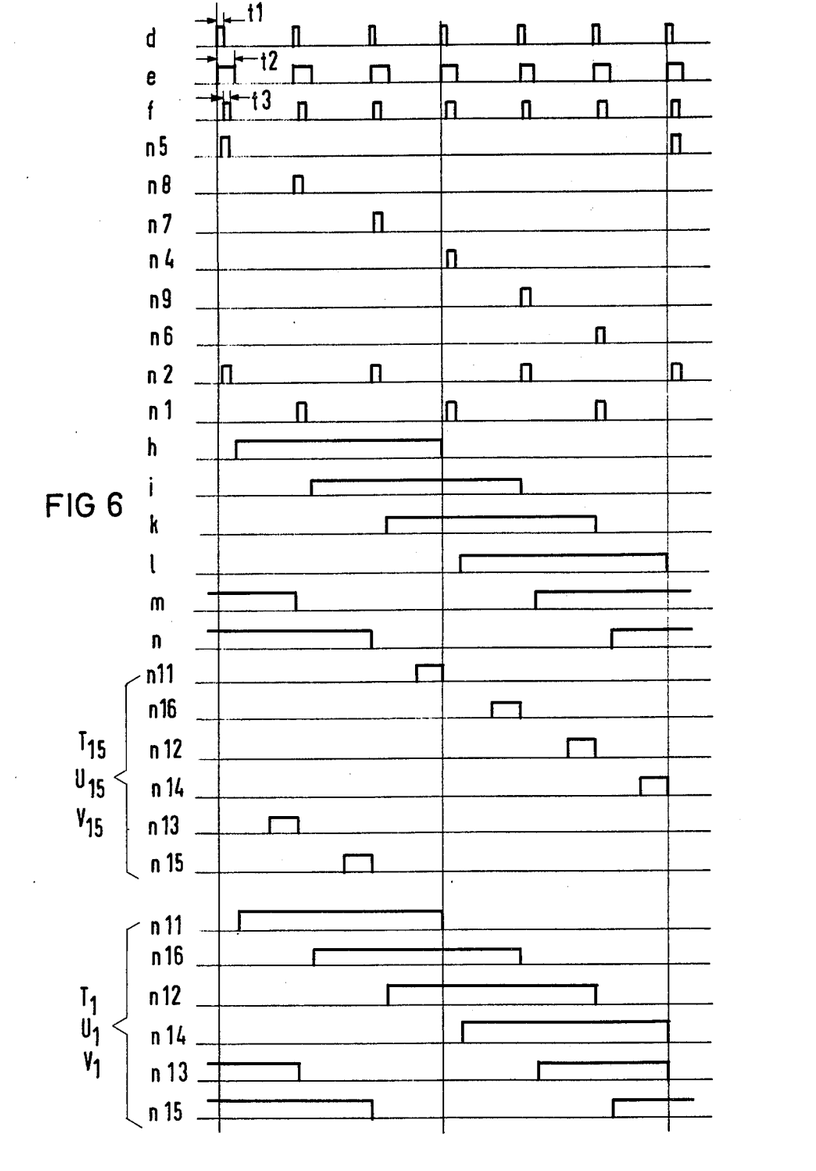

The lower half of FIG. 6 shows the firing pulses used for controlled valves n1 to n16. Since the converter is well known in the art, a detailed description of the firing pulse pattern can be dispensed with. However, the cycle of the commutation process will be described by way of example, referring to the commutation from the controlled main valve n11 to the controlled main valve n14, in order to show that the control unit of the invention is suitable for realizing such complicated firing pulse patterns in a simple manner, circuitwise.

Figure 2:
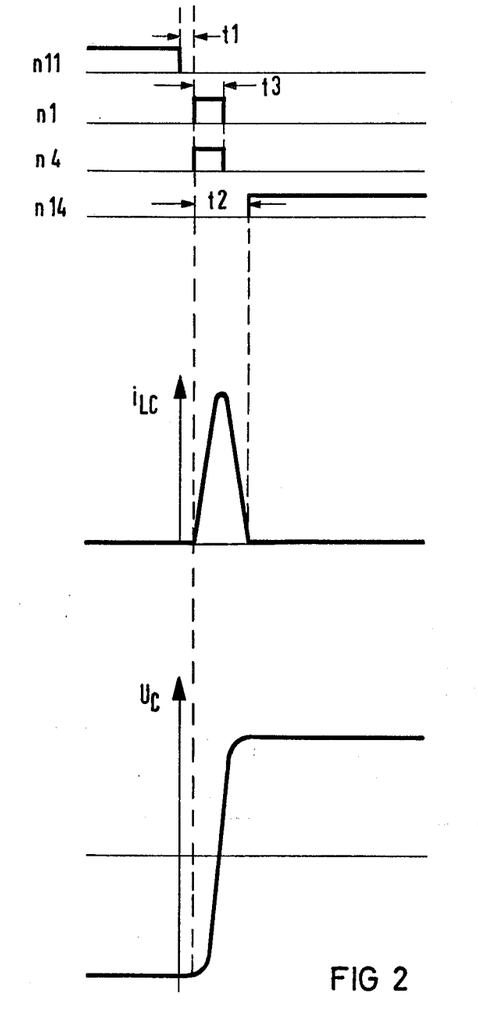
FIG. 2 are charts illustrating the the wave forms in a commutation process in the converter of FIG. 1.

The commutation process illustrated in FIG. 2 shows the firing pulses for the participating controlled valves and the waveforms of the current $i_{LC}$ in the resonant circuit and the voltage $U_c$ across the commutating capacitor C. The latter is assumed to be charged to the first polarity indicated in parentheses in FIG. 1. After a pause t1, following the end of the firing pulse for main valve n11, commutation is initiated by simultaneously firing quenching valve n1 and auxiliary valve n4. The duration of the firing pulses for valves n1 and n4 is designated t3. The current in main valve n11 is commutated off. The LC series resonant circuit reverses, via the recovery diode d11, and commutating caracitor C is charged to a voltage of opposite polarity. When the resonant circuit current $i_{LC}$, crosses zero, the current in valves n1, n4 and d11 is extinguished. After the reversal process, the succeeding main valve n14 is fired after a time t2, measured from the beginning of the firing pulses for the valves n1, n4.

Figure 3:
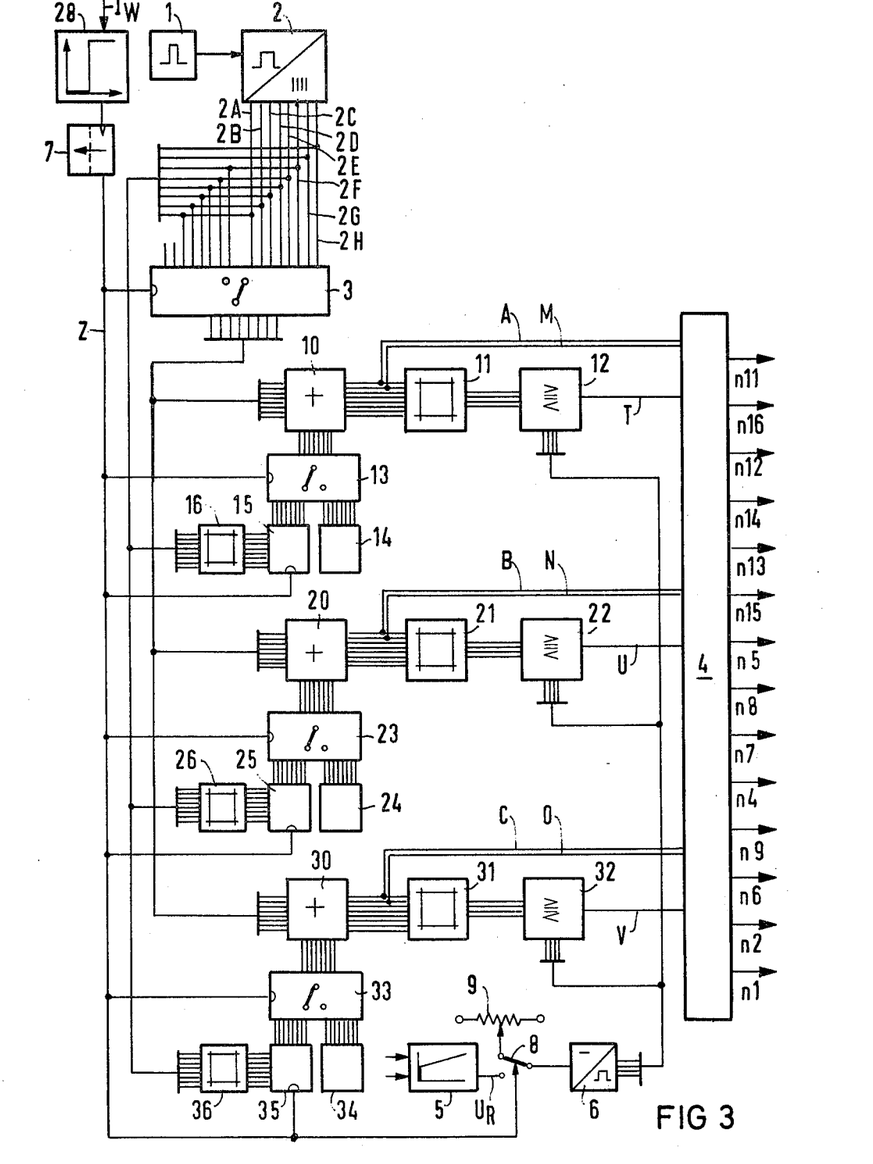
FIG. 3 is a block diagram of a control unit, according to the invention, for the converter of FIG. 1.

FIG. 3 shows an illustrative embodiment of a control unit according to the invention for controlling the three-phase converter shown in FIG. 1, which makes possible a particularly fast shutdown and subsequent operation with load independent current. The firing pulses of the control unit are applied to the control leads of the controlled valves via pulse amplifiers, preferably gated pulse generators, and pulse transformers; optical or high-frequency transmission paths may also be used. For understanding the invention, it only matters that the control unit generates firing pulses for the controlled valves of the converter. The measures customary in digital circuits for forming a timing raster are not shown. The detailed data regarding the components used and the numerical data should be understood to be examples.

The control unit contains a free-running oscillator 1 which generates a pulse sequence having a constant pulse frequency of, for instance, 12.8 kHz. An 8-bit counter 2 divides the pulse frequency of oscillator 1; it operates as a forward counter using binary coding. Pulse sequences with halved pulse frequency appear at the counter outputs. Thus, counter output 2H has a pulse sequence output at a frequency of 50 Hz, output 2G has a pulse sequence output at a frequency of 100 Hz, and so forth, up to output 2A, which has a pulse output at a frequency of 6.4 kHz. The lowest pulse frequency, at the output 2H, which is the desired frequency of the output voltage of the converter, is called the operating frequency in the following.

Outputs 2A to 2H of counter 2 are each connected to a first group of eight inputs of a 2-channel 8-bit multiplexer 3. The last six of a second group of inputs of multiplexer 3 is connected to counter outputs 2A to 2F and is therefore shifted by two digital relative to the first group of inputs. The two unused inputs of the second group always carry O-signal. In accordance with a control signal supplied to its control input, multiplexer 3 connects either the first or the second input group through to its outputs. Multiplexer 3 is controlled so that the output of counter 2 is available, in undisturbed operation, directly at the outputs of multiplexer 3. In the event of a disturbance, the count, shifted by two digits, is connected through to the outputs of multiplexer 3.

The three-phase firing pulse system required for driving the converter is formed by adding phase angle inputs of 120°, electrical, and 240°, electrical, respectively, to a reference phase. For this purpose, the outputs of multiplexer 3 are connected to the first addend inpouts of adders 10, 20, and 30. The second addend inputs of adders 10, 20, and 30 are each connected to the outputs of additional 2-channel 8-bit multiplexers 13, 23, and 33. The summation outputs of adders 10, 20, and 30 are connected to the address inputs of memories of 11, 21, and 31, in which functions are stored. In the embodiment example, these are 256×4-bit ready-only memories (ROMs), in which sawtooth functions are stored.

Figure 7:
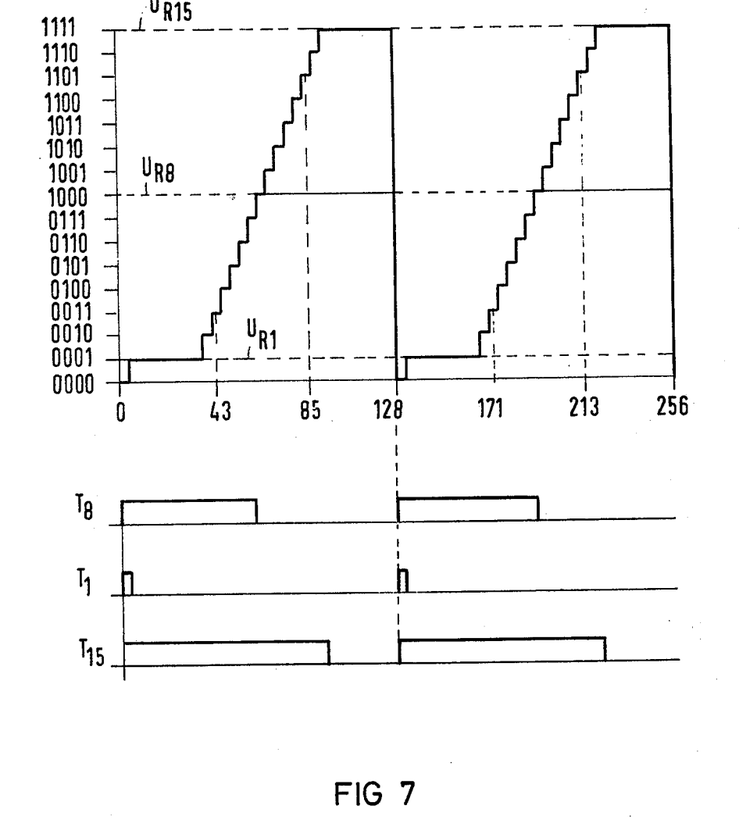
FIG. 7 is a graphic presentation of the programming of a function memory in the control unit of FIG. 3.

The programming of function memories 11, 21, and 31 is shown in FIG. 7. In undisturbed operation, the outputs of multiplexers 13, 23, 33 are connected to the phase angle inputs 14, 24, and 34, which are connected to the first group of multiplier inputs. In the event of a disturbance, the additional multiplexers 13, 23, 33 can be switched-over by a control signal at their control inputs to the signals from temporary memories 15, 25 and 35, which, in turn, are connected to additional memories 16, 26, and 36, which, in the embodiment example, are 256×8-bit ROMs.

The outputs of function memories 11, 21, and 31 are connected to the first comparator inputs of digital comparators 12, 22 and 32, the second comparator inputs of which are connected to the outputs of an analog-to-digital converter 6. In the uncontrolled region, the analog input of analog-to-digital converter 6 is addressed, via a double-throw switching device 8, (shown schematically) to a fixed voltage, which is taken off, for instance, at a potentiometer 9. For controlled operation, the double-throw switching device 8 is switched and analog input of analog-to-digital converter 6 is then addressed by a control signal $U_R$ of a controller 5, which may be, for instance, a current regulator.

The outputs A and M of adder 10, occupied by the most significant signals, as well as the corresponding outputs B and N of adder 20, and the outputs C and O of adder 30, are connected to a logic circuit 4. Logic circuit 4 is further connected, and on the input side, to outputs T, U, and V of comparators 12, 22, and 32. Logic circuit 4 forms the firing pulses for controlled valves n1 to n16. The design of the logic circuit 4 will be described below in connection with the logic equations and FIG. 4.

In uncontrolled operation, the converter shown in FIG. 1 is controlled by a fixed pulse pattern. Preferably, voltage regulation is provided for the input DC voltage, but this is not of interest in this connection. Each period of the output voltage of the converter is divided into $2^8 = 256$ increments, corresponding to the eight counter outputs of the counter 2. The voltage taken off at potentiometer 9 has a fixed value which corresponds to full drive. The multiplexers are so controlled that multiplexer 3 connects the counter output directly to the first addend inputs of adders 10, 20, and 30 and that multiplexers 13, 23 and 33 connect phase angle inputs 14, 24, and 34 to the second addend inputs of adders 10, 20, and 30.

The phase angle input 14 is set to the number 0000 0000. The phase angle input 24 is set to the number 01010101 (decimal: 85), which corresponds, with a negligibly small angle error, to a phase angle of 120° electrical. The phase angle input 34 in set to the number 10101010 (decimal: 170), which corresponds, approximately, to a phase angle 240° electrical. By means of phase angle inputs 14, 24 and 34, the signals at the summation outputs of adders 10, 20 and 30 are shifted, providing a three-phase system, which, except for a negligibly small angle error, is symmetrical. With a fixed phase angle input, phase angle input 14 could be omitted. However, the circuit has the advantage that is is also possible to provide controlled phase angle inputs in which the input values are formed by a phase angle controller via an analog-to-digital converter or by a phase angle computer.

Adders 10, 20 and 30 continuously form the addresses for function memories 11, 21 and 31. The waveforms of the signals appearing on outputs A and M of adder 10, the outputs B and N of adder 20, and the outputs C and O of adder 30 can be seen in FIG. 5 on the lines lettered accordingly. Signals A, B, and C form a 180°-raster. Signals M, N and O form a 30°-raster. The sawtooth functions stored in function memories 11, 21 and 31 are compared in comparators 12, 22 and 32 with the number present at the analog to digital converter 6, which is chosen as 0001 (decimal: 1). If the number read out of the function memories 11, 21 and 31 in accordance with the sawtooth function is smaller than the number read out by the analog to digital converter 6, then pulses appear at the outputs T, U, V of the comparators 12, 22, 32, which are designated $T_1$, $U_1$, and $V_1$ in FIG. 5.

The design and operation of logic circuit 4 will be explained with reference to the circuit diagram shown in FIG. 4 and the pulse diagrams in FIGS. 5 and 6. The pulse signals in the latter figures are designated with the reference symbols of the connecting lines on which they appear. The firing pulses are designated with the reference symbols of the corresponding valves.

Figure 4:
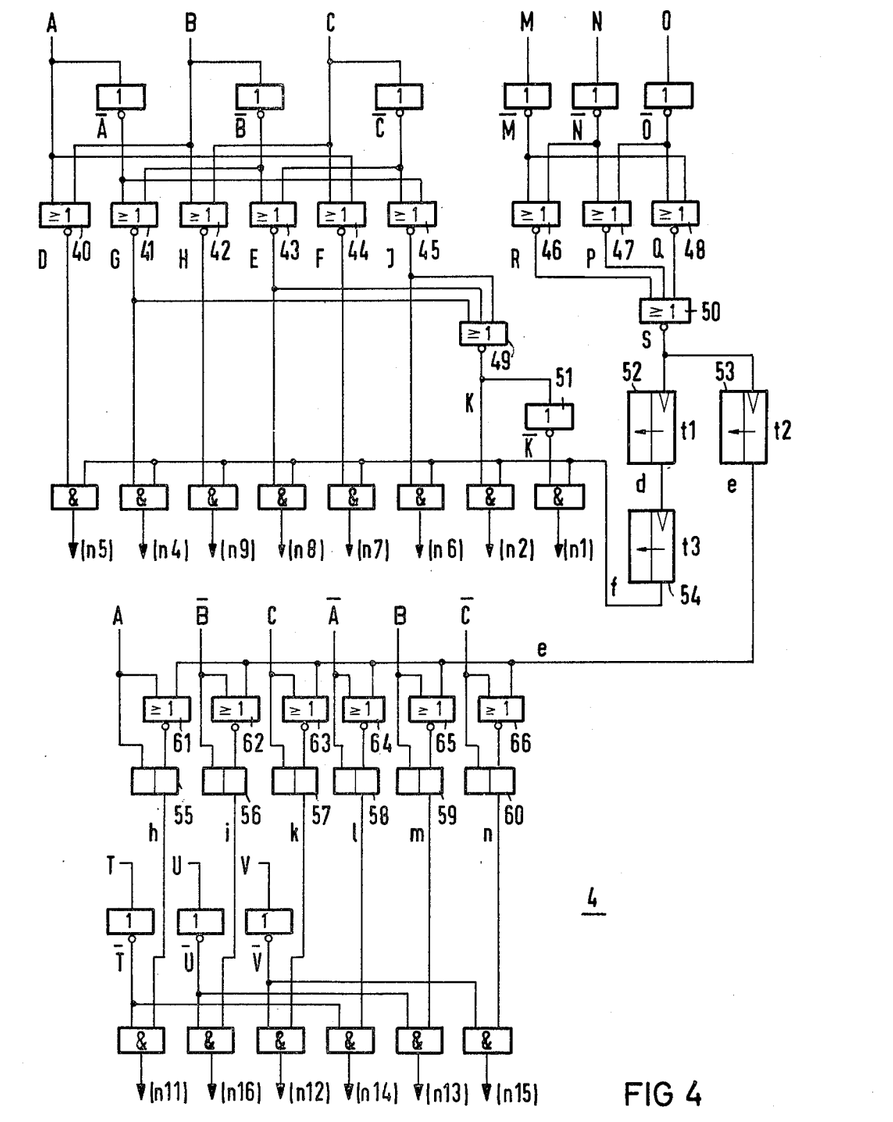
FIG. 4 is a block diagram of the logic circuit used in the control unit of FIG. 1.
Figure 5:
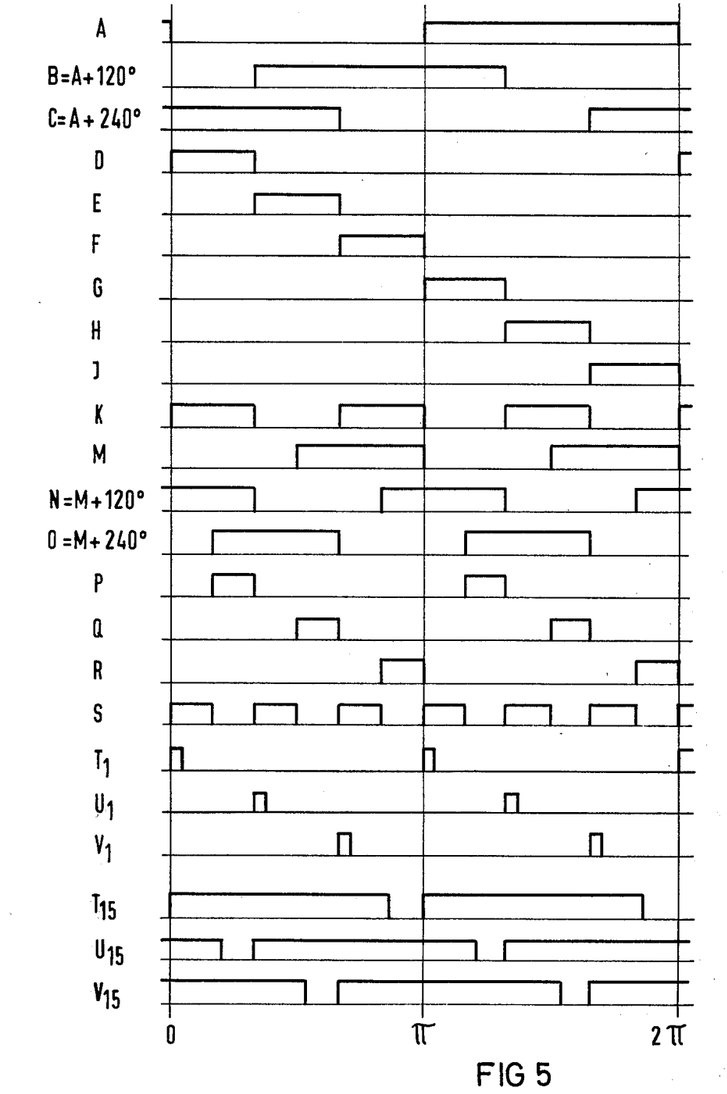
FIGS. 5 and 6 are diagrams of key signal waveforms in the logic circuit of FIG. 4.

FIG. 4 is a separate presentation of the design of logic circuit 4 in which firing pulses for quenching valves n1, n2, auxiliary valves n4 to n9, as well as for main valves n11 to n15, are formed. Signals A, B, C, M, N, O, fed to the input side of logic circuit 4 from the summation outputs of adders 10, 20, and 30, and the drive signals T, U, V, from the comparators 12, 22, and 32 are first inverted in inverters, which are not numbered in the drawing. From the original and the inverted signals, signals D and J are formed in NOR gates 40 to 45 in accordance with the following logic equations:

$D = \overline{A} \vee \overline{B}$
$E = \overline{B} \vee \overline{C}$
$F = \overline{A} \vee \overline{C}$
$G = \overline{A} \vee \overline{B}$
$H = \overline{B} \vee \overline{C}$
$J = \overline{A} \vee \overline{C}$ The pulses D to J are always 60°-pulses. From these pulses, a signal K is assembled as a 60°-raster by the interlinkage in the NOR gate 49:

$K = \overline{E} \vee \overline{G} \vee \overline{J}$

The signal K is inverted in the inverter 51.

From the signals M, N, O and $\overline{M}, \overline{N}, \overline{O}$, the signals P, Q, R, are formed in the NOR gates 46, 48:

$P = \overline{N} \vee \overline{O}$
$Q = \overline{M} \vee \overline{O}$
$R = \overline{M} \vee \overline{N}$ The signals P, Q, R are 30°-pulses which are interlinked in the NOR gate 50 to form the signal S which represents a 30°-raster:

$S = \overline{P} \vee \overline{Q} \vee \overline{R}$

The timing pulses d, e, f are formed from the signal S by monostable multivibrators 52, 53, 54. Monostable multivibrator 52, having a delay time t1, and monostable multivibrator 53, having delay time t2, are tiggered with every rising edge of the signal S. The output signal d of monostable multivibrator 52 triggers monostable multivibrator 54, which has delay time t3. Time t1 is the pause between the end of a main pulse and the start of the succeeding quenching pulse. Time t2 is the pause between the end of a firing pulse for a given main valve and the start of the firing pulse for the opposite main valve. Time t3 is the pulse duration of the quenching pulses (see also FIG. 2).

Output signal f of multivibrator 54 is interlinked in AND gates, which are not given reference numbers in the drawing, with the signals D to J to form the firing pulses for the auxiliary valves n4 to n9, as well as, in additional AND gates, with the signals K and $\overline{K}$ to form firing pulses for the quenching valves n1, n2:

$n5 = D \wedge f$
$n8 = E \wedge f$
$n7 = F \wedge f$
$n4 = G \wedge f$
$n9 = H \wedge f$
$n6 = J \wedge f$
$n1 = \overline{K} \wedge f$
$n2 = K \wedge f$ For formation of firing pulses for controlled main valves n11 to n16, the output signal e of multivibrator 53 is interlinked with the signals A, B, C, $\overline{A}, \overline{B}, \overline{C}$, in NOR gates 61 to 66. The outputs of NOR gates 61 to 66 are connected to the setting inputs of bistable multivibrators 55 to 60, the resetting inputs of which are fed by one of the signals A, B, C, $\overline{A}, \overline{B}, \overline{C}$, respectively. The firing pulses for the main valves n11 to n15 are formed from the signals h to n at the outputs of multivibrators 55 to 60 by conjunctive interlinking with the inverted drive signals $\overline{T}, \overline{U}, \overline{V}$:

$n11 = \overline{T} \wedge h$
$N16 = \overline{U} \wedge i$
$n12 = \overline{V} \wedge k$
$n14 = \overline{T} \wedge l$ $n13 = \overline{U} \wedge m \quad n15 = \overline{V} \wedge n$ The drive signals T, U, V determine the drive of the converter. For unregulated operation of the converter, the drive signals can be set as fixed values, for instance, by monostable multivibrators which are triggered by suitable signals at outputs of the adders. In FIG. 5, the drive signals T, U, V are shown for full drive T1, U1, V1 and for minimum drive T15, U15, V15. It is seen that the drive signal T, for instance, can be formed by monostable multivibrators which are triggered by the rising edge of the signal D or the rising edge of the signal G, respectively, and the delay time of which is adjusted to the desired duration of the drive signal. The same applies to the drive signals U and V, which can be derived from the signals E and H as well as F and J, respectively. Changes in the drive are possible by corresponding changes of the delay times of the multivibrators.

In another feature, the illustrative embodiment of the invention shows formation of drive signals T, U, V by a digital comparison of a control signal with the output signals of a number of function memories. The programming of a function memory will be explained first, referring to FIG. 7.

FIG. 7 is a graphic presentation of the programming of a function memory, specifically function memory 11 of FIG. 3. The horizontal axis has the addresses, written in decimal notation, and, along the vertical axis, the memory contents that can be called up by the respective addresses are shown, in binary presentation. The memory contents consist of the numbers 0 to 15. For instance, function memory 11 reads out the binary number 1101 (decimal: 13) when the address 171 is applied. If the addresses 0 to 255 are applied by adder 10, in sequence, then the numbers appearing at the memory output form, in graphic presentation, two successive sawteeth having steps due to the digitalization. From this is formed, through digital comparison with a control signal $U_R$ in comparator 12, the drive signal T for main valves n11 and n14. For instance, a drive signal $T_8$ is obtained for a control signal $U_{R8}$ which is converted into the number 1000 (decimal: 8). The maximum drive of the converter takes place for a control signal $U_{R1}$ which is defined as 0001 (decimal: 1), the drive signal T1 being formed by digital comparison between $U_{R1}$ and the numbers read out from the function memory. At minimum drive, a drive signal T15 is formed by digital comparison of the control signal $U_{R15} = 1111$ (decimal: 15). In this manner, the drive signals T1, U1, V1 for full drive and T15, U15 and V15 for minimum drive, already shown in FIG. 5, are again generated. These signals, however, can be varied in intermediate steps by the digital comparison as described, in dependence on a control signal.

The circuit for formation of the described drive signals is shown in FIG. 3. Controller 5 generates a control signal $U_R$, which is converted into a number between 0001 (decimal: 1) and 1111 (decimal: 15) by analog-to-digital converter 6. The digitalized control signal is compared in comparators 12, 22, and 32 with the numbers read out from function memories 11, 21, and 31. The drive signals T, U, V are high when the digitalized control signal is larger than the read out number.

In programming the function memories, other functions can be written in, such as ramp functions having different slopes. In particular, it should be noted that nonlinear relationships between the control signal and the desired drive can be accommodated by appropriate programming.

FIG. 3 also shows the way in which control can be switched between controlled and uncontrolled operation. The analog input of analog-to-digital converter 6 is connected via the double-throw switch 8, either to the output of controller 5 or of potentiometer 9. In uncontrolled operation, the double-throw switching device 8 is in the position shown. Potentiometer 9 is adjusted to provide a voltage for which analog-to-digital converter 6 will produce a number corresponding to the desired drive, for instance, the number 0001, for maximum drive, with the drive signals $T_1$, $U_1$, and $V_1$.

The inverter of FIG. 1 has only one L-C series-resonant circuit for all main valves. In the event of a fast shutdown of the inverter due to a protection command, not all current-carrying main valves can therefore be quenched simultaneously by corresponding firing pulses. Rather, there is the danger that in case of a short circuit of a connected load, the short circuit current will rise to a value at which the ability of the inverter to commutate is exceeded. Therefore, the measures described in the following are provided so that the inverter can be shut down rapidly upon a protection command.

To form a protection command, the output current $I_W$ of the inverter, for instance, is measured and fed to a limit detector 28. (FIG. 3). If the output current of the inverter exceeds a predetermined limit, limit detector 28 changes its output signal and triggers a monostable multivibrator 7, which generates a pulse Z (shown in FIG. 8) of predetermined duration, such as 6.7 msec. The pulse Z from monostable multivibrator 7 initiates a fast shutdown of the inverter by blocking the firing pulses for the controlled main valves n1 to n16 of the inverter. In addition, the operating frequency is increased, preferably to several times the normal operating frequency and the phase of the system is changed, relative to the system with normal operating frequency. The increased operating frequency is chosen so that the minimum times prescribed for the valve types used in the inverter circuit are observed. These minimum times are a function of the design of the components of the commutation circuit, the maximum current to be commutated, and the recovery time of the valves. If $2^n$-times the normal operating frequency is chosen as the increased operating frequency, then the frequency increase can be accomplished very simply by shifting the counter outputs by n digits, by means of multiplexer 3. In the illustrative embodiment of FIG. 3, the second group of inputs of the multiplexer is connected to the counter outputs 2A to 2F, being shifted, thereby, relative to the first group of inputs by two digits. The pulse Z from monostable multivibrator 7, used as the control signal, switches multiplexer 3 over so that the counter reading, which is shifted by two digits, appears at the multiplexer outputs and is fed to the first addend inputs of adders 10, 20, and 30. At the same time, the other multiplexers 13, 23, and 33 are also switched over and a transfer pulse is fed into memories 15, 25, and 35. Memories 15, 25, 35 take over the numbers instantaneously present at the outputs of memories 16, 26, and 36, which are then connected, via the multiplexers 13, 23, 33, to the second addend inputs of adders 10, 20, and 30, instead of phase angle inputs 14, 24, and 34. The adders 10, 20, and 30 now add the counter content, shifted by two digits, to the numbers read out from memories 16, 26, and 36 at the instant of the disturbance. Shifting the counter content by two digits corresponds to increasing the operating frequency four times. The additional memories 16, 26, and 36 are programmed so that a pulse shift for all firing pulses takes place, which depends on the counter content at the instant of the disturbance and also, therefore, on the instantaneous value of the phase voltages of the converter. This will now be explained in detail, making reference to the diagram of FIG. 8.

Figure 8:
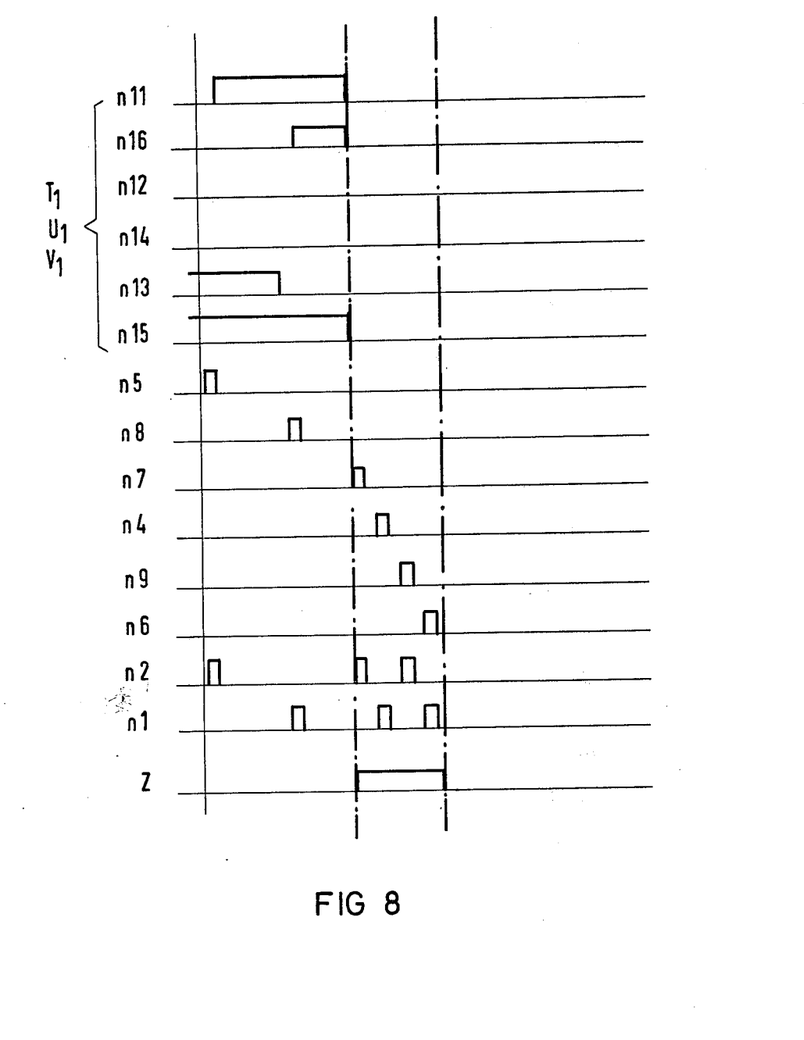
FIG. 8 are diagrams illustrating the pulse shift, in the event of a fast shutdown of the converter.

FIG. 8 shows, in a manner corresponding to that of FIG. 6, the firing pulses for the main valves n11 to n16 for maximum drive, as well as the firing pulses for quenching valves n1, n2 and auxiliary valves n4 to n9 at the normal operating frequency. The signal Z of multivibrator 7 controls the shutting-down process. With the rising edge of pulse Z, the firing pulses for the main valves are blocked; the firing pulses for the quenching valves and the auxiliary valves are shifted; and the operating frequency is increased. With the falling edge of the pulse Z, the firing pulses for the quenching valves and the auxiliary valves also blocked, in addition. The converter is shut down.

The shifting of the firing pulses for the quenching valves is based on the insight that one should not wait, in a fast shutdown system, until the next quenching pulse is formed in the normal rythm but that the next quenching pulse should be formed immediately after the shutdown command. If the shutdown command falls on a quenching pulse, this quenching pulse is repeated in order to make sure that the associated main valve is actually extinguished. If, on the other hand, the shutdown command falls between the quenching pulses, then the pulse raster is shifted in time and the next quenching pulse appears immediately.

For each instant, a shift of the firing pulses for the quenching valves can be determined which makes possible a shutdown of the converter in optimum time. To realize the shift of the pulse raster, in the event of the fast shutdown with simple circuit means, it is advantageous to subdivide a period of the output voltage of the converter into a number of regions and to determine the shift as a function of the region into which the fast shutdown falls.

The provision for increasing the operating frequency accelerates the shut-down process and insures synchronism, in the specific inverter described, between the firing pulses for the quenching valves and the firing pulses for the auxiliary valves.

In the presentation of FIG. 8, main valves n11, n16, and n15 are carrying current at the time of the rising edge of the shutdown command Z and are to be quenched in optimum time. The pulse raster of the firing pulses for the quenching valves and the auxiliary valves is shifted forward so far that the firing pulses for the valves n2 and n7 come immediately, followed by the firing pulses for valves n2 and n9. Main valves n15, n11, and n16 are extinguished in that order. The converter is shut down. For safety reasons, the shutdown command Z lasts somewhat longer.

The realization, circuitwise, is shown in FIG. 3. The second addend inputs of adders 10, 20, and 30 are connected, in the event of a fast shutdown, to ROMs 16, 26, and 36 via multiplexers 13, 23, and 33 and temporary memories 15, 25, and 35. The address inputs of ROMs 16, 26 and 36 are connected to the outputs of counter 2. The ROMs 16, 26, and 36 are programmed so that for every counter content, a number is read out which, when added to the counter reading or to the counter reading, shifted by one or several digits, furnishes signals at the outputs of the adders which cause suitable firing pulses for the quenching valves and the auxiliary valves, via logic circuit 4, to shut down the converter in optimum time. For a fast shutdown, multiplexers 3, 13, 23, and 33 are therefore switched and a transfer command is given for temporary memories 15, 25, and 35. Not further shown is the blocking of the firing pulses for the main valves, which can be accomplished, for instance, by suitable blocking gates, as well as the later blocking of the firing pulses for the quenching valves and the auxiliary valves.

The control unit according to the invention thus makes possible several stages of expansion and modes of operation:

The simplest design, for uncontrolled operation with a fixed pulse pattern, contains an oscillator 1 and a counter 2, an adder 20 with a phase angle input 33, as well as a logic circuit 4. The two counter outputs 2G, 2H are fed to the input side of logic circuit 4 as channels A and M. The corresponding outputs of adders 20 and 30 are likewise fed to the input side of logic circuit 4 as channels B, N and C, O. The drive signals T, U, and V are set in, fixed, for instance, in the manner described above at page 14.

For controlled operation, function memories 11, 21 and 31 and the following comparators 12, 22, and 32 are required in addition, as well as measures for forming a digitalized control signal, for instance, such as analog-to-digital converter 6 and a preceeding controller 5. If switching between controlled and uncontrolled operation is desired, this can be realized by a double-throw switching device 8 in the analog input of analog-to-digital converter 6, by means of which its input voltage can be switched between a control signal and a fixed predetermined voltage.

If fast shutdown of the converter controlled by the control unit is required, the control unit is expanded by adding: multiplexers 3, 13, 23, and 33; ROMs 16, 26, and 36; and temporary memories 15, 25, 35. The converter is shut down by shifting the firing pulses for the quenching and auxiliary valves in optimum time. In addition, the operating frequency can be increased. Subsequent to a fast shutdown, controlled operation with load independent current is possible in order to make safety devices respond selectively.

What is claimed is:

1. A control unit for a multiphase static converter comprising:
   an oscillator;
   a number of adders having summation outputs and first and second addend inputs;
   a binary coded counter driven by the oscillator and having counter outputs which are coupled to the first addend inputs of the adders;
   means for supplying phase angle inputs to the second addend inputs of the adders; and
   a logic circuit coupled to the summation outputs of the adders for deriving timing pulses and interlinking them to form firing pulses for the controlled valves of the converters.

2. A circuit arrangement according to claim 1 further comprising:
   means for blocking the firing pulses for the controlled main valves in the event of a fast shutdown and for shifting the firing pulses for the quenching valves in dependence on the instantaneous phase of the output voltage of the converter.

3. A circuit arrangement according to claim 1, further comprising means for increasing the operating frequency of the converter in the event of a fast shutdown.

4. A control unit for a multiphase static converter comprising:
- an oscillator;
- a binary coded counter driven by the oscillator and having counter outputs;
- a first multiplexer having outputs which can be connected to a first group of inputs or to a second group of inputs, the first group of inputs being connected to the counter outputs and the second group of inputs being connected to the outputs of the counter, but shifted by at least one digit;
- a number of adders each having first addend inputs, second addend inputs, and summation outputs, the first addend inputs being connected to the outputs of the first multiplexer;
- an additional multiplexer for each adder, having outputs connected to the second addend input thereof;
- means for supplying phase angle inputs to one set of inputs of each second multiplexer;
- a temporary memory having inputs and having outputs connected to the second set of inputs of each multiplexer;
- a data memory having address inputs connected to the counter outputs and each having outputs connected to the inputs of a temporary memory, the data memory being programmed for a firing pulse shift which is optimum for every pulse count; and
- a logic circuit connected to the summation outputs of the adders for deriving timing pulses from the signals at the summation outputs of the adders and interlinking them to form firing pulses for the controlled valves of the converter;

wherein, in the event of a fast shutdown, the multiplexers may be switched from their first inputs to their second inputs, connecting the inputs of the adders to the counter outputs which are shifted by at least one digit and to the outputs of the temporary memories.

* * * * *